(12) United States Patent
Peng et al.

(10) Patent No.: US 10,075,063 B2
(45) Date of Patent: Sep. 11, 2018

(54) DUAL STAGE VCC CHARGING FOR SWITCHED MODE POWER SUPPLY

(71) Applicant: DIALOG SEMICONDUCTOR INC., Campbell, CA (US)

(72) Inventors: Mingsheng Peng, Campbell, CA (US); Andrey Malinin, Campbell, CA (US); Pengju Kong, Campbell, CA (US); Qiu Sha, Campbell, CA (US); Guang Feng, Campbell, CA (US)

(73) Assignee: DIALOG SEMICONDUCTOR INC., Campbell, CA (US)

(*) Notice: Subject to any disclaimer, the term of this patent is extended or adjusted under 35 U.S.C. 154(b) by 0 days.

(21) Appl. No.: 15/406,564

(22) Filed: Jan. 13, 2017

(65) Prior Publication Data
US 2018/0205312 A1     Jul. 19, 2018

(51) Int. Cl.
| H02M 3/335 | (2006.01) |
| H02M 1/36 | (2007.01) |
| H02M 1/08 | (2006.01) |
| H02M 1/00 | (2006.01) |

(52) U.S. Cl.
CPC .............. *H02M 1/36* (2013.01); *H02M 1/08* (2013.01); *H02M 3/335* (2013.01); *H02M 3/33592* (2013.01); *H02M 2001/0009* (2013.01)

(58) Field of Classification Search
CPC ....................................... H02M 3/335
See application file for complete search history.

(56) References Cited

U.S. PATENT DOCUMENTS

| 2003/0174528 A1* | 9/2003 | Wong ...................... H02M 1/36 363/147 |
| 2013/0070487 A1* | 3/2013 | Ozawa .................... H02M 1/36 363/21.17 |

* cited by examiner

*Primary Examiner* — Nguyen Tran
*Assistant Examiner* — Trinh Q Dang
(74) *Attorney, Agent, or Firm* — Haynes and Boone, LLP

(57) ABSTRACT

A startup circuit is provided for establishing the Vcc voltage level of a switching power converter. The startup circuit uses a switch controller and path switching transistor to provide a two-stage Vcc capacitor charging that reduces startup time while avoiding short circuit damage through the alternate usage of a high impedance charging path and a low-impedance charging path.

21 Claims, 5 Drawing Sheets

US 10,075,063 B2

DUAL STAGE VCC CHARGING FOR SWITCHED MODE POWER SUPPLY

TECHNICAL FIELD

This application generally relates to switching power converters and, more particularly, to a startup circuit of a flyback power converter.

BACKGROUND

Switching power converters include a controller that controls the cycling of a power switch to regulate the delivery of power to a load. Like all electronic circuits, the controller requires a power supply voltage. During normal operation, the generation of the power supply voltage for the controller may be derived from the output power delivery. For example, a flyback converter typically includes an auxiliary winding for its transformer. Power is reflected onto the auxiliary winding while the secondary current flows following the cycling off of the power switch during each power switch cycle. A power supply capacitor couples to the auxiliary winding through a normal operation charging circuit that is active during normal operation to maintain the charging of the power supply capacitor with the power supply voltage. The regulation of the power supply voltage is in a non-isolated switching power converter such as a buck converter is even more convenient in that the power supply capacitor can be coupled to the output voltage during normal operation to charge the capacitor with the power supply voltage.

Although the controller power supply voltage may thus be maintained by siphoning from the power delivered to the load during normal operation, there is no such power delivery at startup. It is thus conventional for a switching power converter to include a separate startup charging circuit that drives the power supply capacitor at startup. For example, a switching power converter that receives its input power from an AC mains will typically include a diode bridge that rectifies the AC input voltage. The resulting rectified input voltage is smoothed through a bulk input capacitor. A startup circuit thus couples to an input node carrying the rectified input voltage stored across the bulk input capacitor to generate the power supply voltage at power-up of the switching power converter. When normal operation ensues, the startup circuit is deactivated so that the normal operation charging circuit may maintain the power supply voltage for the controller. The startup circuit typically uses a relatively-high-impedance current limiting resistor to limit the amount of current into the power supply capacitor at power-up of the switching power converter. Such current limiting is important because the controller receives the controller power supply voltage over a power pin (Vcc pin). Should the Vcc pin have a short to ground, the relatively-high-impedance current limiting resistor prevents excessive charging currents through the startup circuit that could otherwise damage components of the startup circuit. But the high impedance of the current limiting resistor can negatively impact startup operation of the switching power converter. For one example, the relatively-high-impedance of the current limiting resistor lengthens the amount of time until a suitably-high level is reached for the power supply voltage so that normal operation may begin. In addition, the likelihood of a voltage ringing increases as the resistance of the current limiting resistor is increased due to undesirable interactions with the parasitic capacitance of the power switch transistor.

It is thus desirable to reduce the resistance of the current limiting resistor in the startup circuit to reduce the startup charging period and any voltage ringing. But such a reduced impedance for the current limiting resistor then exposes the startup circuit to damage should the Vcc pin of the controller have a short or soft-short to ground. Accordingly, there is a need in the art for startup circuits for switching power converters with reduced startup charging periods without incurring damage from any short circuit conditions on the power pin of the controller.

SUMMARY

To address the need in the art for improved startup operation of switching power converters, a startup circuit is provided that has a changing impedance for the charging path to the power supply capacitor (also denoted herein as the Vcc capacitor) during the startup charging period. In particular, the charging path to the Vcc capacitor is a high impedance charging path during a first stage of a startup charging period and is a low impedance charging path during a second stage of the startup charging period. Such a low impedance charging path is advantageous in providing a reduced charging period for the power supply voltage (also denoted herein as Vcc) to reach its nominal or operating value so that normal operation may ensue. But the high impedance charging path activated during the first stage of the charging startup period protects the startup circuit from excessive currents resulting from any short-circuit conditions at the Vcc pin for the controller.

The order of the first and second stages in the startup charging period is arbitrary. In other words, a startup circuit as disclosed herein may initiate operation in the first stage and finish operation in the second stage. Conversely, the startup circuit may begin operation in the second stage and finish operation in the first stage. Regardless of the order of the first and second stages, a duration of the second stage will typically be longer than a duration of the first stage to reduce the startup charging period. Moreover, by reducing the duration of the first stage, any voltage ringing that is produced will be damped out over the longer duration of the second stage.

To provide the first and second stages of the startup charging period, the startup circuit includes a low impedance current limiting resistor and a high impedance current limiting resistance. These current limiting resistors may be coupled in parallel or in series. In a series embodiment, an impedance switch transistor couples across the high impedance current limiting resistor such that the high impedance resistor is shorted out when the impedance switch transistor is switched on. The startup circuit includes a switch controller that is configured to switch on the impedance switch transistor to activate the second stage of the startup charging period and to switch off the impedance switch transistor to activate the first stage of the startup charging period.

By using a low impedance charging path during the second stage, startup time can be reduced by the faster charging of Vcc to the desired operating voltage level. But the danger of excessive current from any Vcc pin short circuit conditions is virtually eliminated by the first stage of the startup charging period during which the charging path to the power supply capacitor is a high impedance charging path. Thus, the startup circuit provides a two-step startup charging period that reduces startup time and increased protection from voltage ringing yet provides current limiting that protects the switching power converter from Vcc pin short circuits.

These and additional advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A two-stage startup circuit is disclosed that provides improved charging of the controller power supply voltage (Vcc) in a switching power converter. The startup circuit includes a switch controller and an impedance switch transistor to provide a two-stage Vcc capacitor charging. The two stages form the startup charging period during which the startup circuit is active. In the first stage, the switching controller switches the impedance switch transistor to select for a high impedance charging path for charging the power supply capacitor (Vcc capacitor) with the controller power supply voltage. In the second stage, the switching controller switches the impedance switch transistor to select for a low impedance charging path for charging the power supply capacitor with the controller power supply voltage. The first stage may be the initial stage such that the startup charging period comprises the first stage followed by the second stage. Conversely, the second stage may begin the startup charging period followed by the first stage in other startup circuit embodiments.

Although both stage orders provide the same benefits of a reduced charging period, beginning the startup charging period with the first stage (activating the high impedance charging path) also provides the benefit of protection against short circuits from the Vcc pin for the controller to ground. If such a short circuit exists, beginning the startup period with the low impedance charging path activated in the second stage could expose the startup circuit components to dangerously high charging circuits. Beginning the startup charging period with the first stage thus enables the switch controller to inhibit such short-circuit-induced damage since the threshold voltage for transitioning to the second stage will not be reached given the short circuit at the VCC pin. The following discussion will thus be directed to startup circuit embodiments in which the first stage is followed by the second stage without loss of generality. In addition, the following discussion will also be directed to flyback converter embodiments but it will be appreciated that the startup circuits disclosed herein may be included in virtually any type of switching power converter such as a buck converter, a boost converter, of or a buck-boost converter.

Figure 1A:
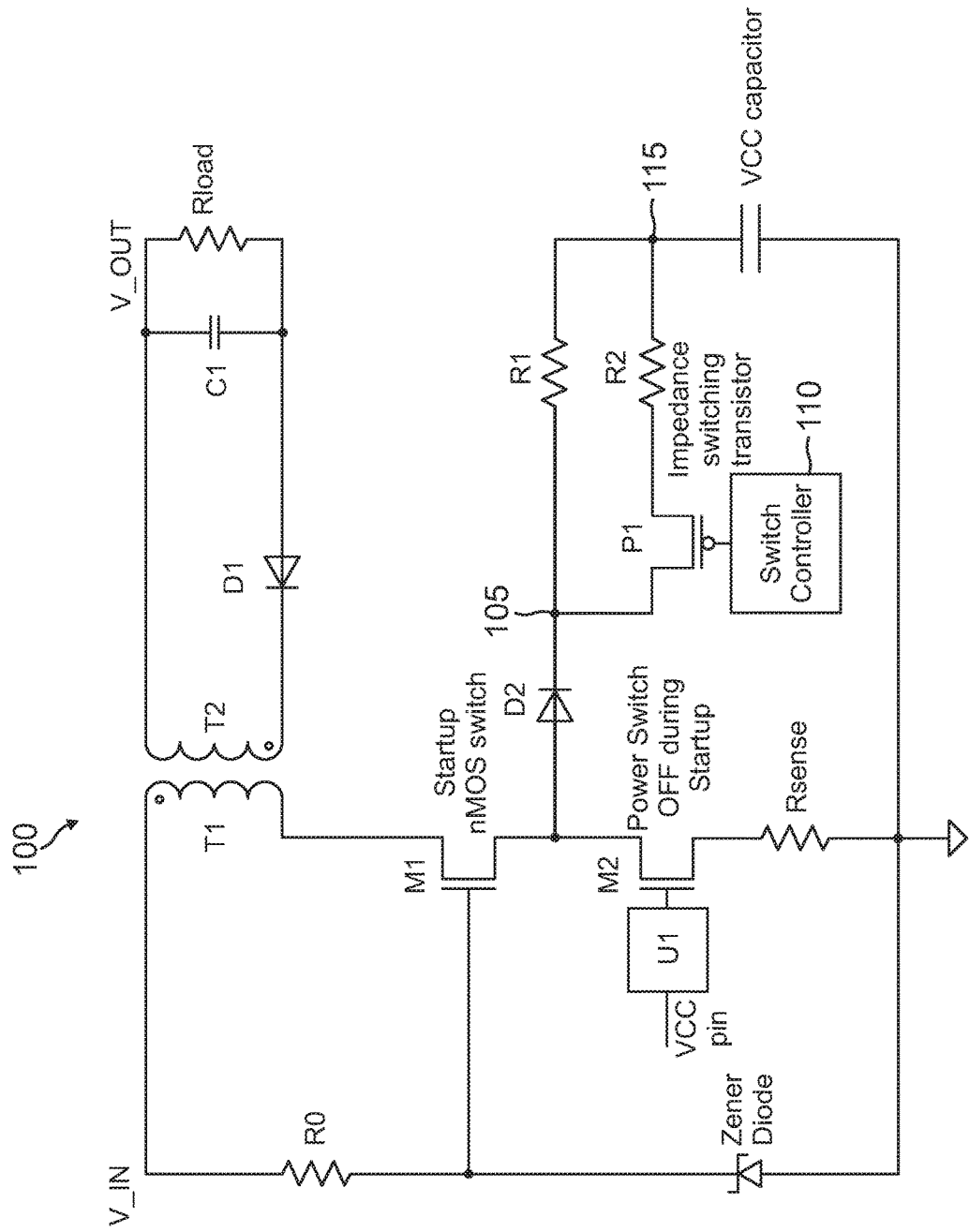
FIG. 1A is a diagram of a flyback converter configured for dual stage Vcc charging in which the high impedance current limiting resistor and the low impedance current limiting resistor are arranged in parallel in accordance with an embodiment of the disclosure.

As discussed previously, the impedance switch transistor is coupled to one of a low impedance current limiting resistor and a high impedance current limiting resistor. The coupling depends upon whether the current limiting resistors are arranged in series or in parallel. A parallel embodiment will be discussed first with regard to an example flyback converter 100 shown in FIG. 1A. Flyback power converter 100 includes a transformer having a primary winding T1 connected to an input voltage node carrying a voltage V_IN, which may be derived, for example, from the rectification of an AC mains voltage. The primary winding T1 is in series with an NMOS startup switch transistor M1 that in turn is in series with an NMOS power switch transistor M2. However, it will be appreciated that the startup circuit techniques disclosed herein are independent of the type of power switch transistors and thus may be applied to alternative embodiments in which the power switch transistor M2 is a bipolar junction transistor (BJT) power switch.

For normal operation after startup, a primary controller U1 is configured to control the on state and the off state of power switch transistor M2 so as to regulate an output voltage (V_OUT) or the output current supplied to a load (Rload) coupled to a secondary winding T2 of the transformer. A diode D1 rectifies the secondary current through secondary winding T2. The output voltage is smoothed by an output capacitor C1 arranged in parallel with the load. Flyback converter 100 includes a current sense resistor Rsense connected in series with power switch transistor M2 to monitor the primary winding current during normal operation. It will be appreciated that diode D1 may be replaced by a synchronous rectifier switch in alternative embodiments. Controller U1 is configured to maintain power switch transistor Q2 off during the period in which the startup circuit is active.

The startup circuit includes a resistor R0 in series with a zener diode. The resistor R0 couples to the input voltage node whereas the zener diode couples to ground such that the rectified input voltage develops the zener breakdown voltage at a node between the zener diode and resistor R0. This node drives the gate of startup switch transistor M1 such that M1 is switched on by the zener breakdown voltage at startup. A startup circuit diode D2 couples between the drain of power switch transistor M2 (or equivalently, the source of startup switch transistor M1) and is in series with a high impedance current limiting resistor R1 through a node 105. An impedance switch transistor such as a PMOS impedance switch transistor P1 couples between node 105 and a low impedance current limiting resistor R2. It will be appreciated that other types of impedance switch transistors may be used in alternative embodiments such as an NMOS impedance switch transistor. The impedance of high impedance current limiting resistor R1 is greater than the impedance of low impedance current limiting resistor R2. For example, high impedance current limiting resistor R1 may have a resistance of 25K Ω whereas low impedance current limiting resistor R2 may have a resistance of 3 K Ω Both current limiting resistors R1 and R2 couple in parallel to a Vcc capacitor through a node 115.

A switch controller 110 controls the on and off states of impedance switch transistor P1 to select for the first and second stages in the startup charging period to develop a power supply voltage Vcc across the Vcc capacitor. This power supply voltage Vcc is received by controller U1 on a Vcc pin or terminal to power the operations of controller U1. Note that switch controller 110 is shown separately from controller U1 but would typically be integrated within controller U1 in alternative embodiments. The receipt of the power supply voltage Vcc on the VCC pin at controller U1 thus also provides the power supply voltage Vcc for the operation of switch controller 110.

Upon the application of the rectified input voltage to flyback converter 100 (e.g, flyback converter 100 is plugged into an AC mains power outlet), startup diode D2 will be forward biased such that the rectified input voltage can drive current through primary winding T1, startup switch transistor M1, and startup diode D2 to charge node 105. Since high impedance current limiting resistor R1 is connected to node 105, the charging of node 105 drives current through high impedance current limiting resistor R1 to slowly charge Vcc during the first stage of the startup charging period. The high impedance charging path in the first stage is thus formed by high impedance current limiting resistor R1. Low impedance current limiting resistor R2 does not contribute to this charging during the first stage because switch controller 110 is configured to maintain impedance switch transistor P1 off until Vcc reaches a threshold voltage. The magnitude of the threshold voltage determines the duration of the first stage of the startup charging period.

When the power supply voltage Vcc reaches the threshold voltage, switch controller 110 switches on impedance switch transistor P1 to couple low impedance current limiting resistor R2 in parallel with high impedance current limiting resistor R1 between nodes 105 and 115. The low impedance charging path in the second stage is thus formed by the parallel combination of current limiting resistors R1 and R2. The current through primary winding T1, startup switch transistor M1, startup diode D2 will thus significantly increase during the second stage due to the low impedance charging path that is activated by the switching on of impedance switch transistor P1. The second stage of the startup charging period will therefore result in a rapid charging of the power supply voltage Vcc. This rapid charge is maintained until the power supply voltage Vcc reaches a power-on-reset (POR) value, whereupon the startup circuit is deactivated so that the power supply voltage Vcc may be charged through the conventional normal charging path (not illustrated).

Figure 1B:
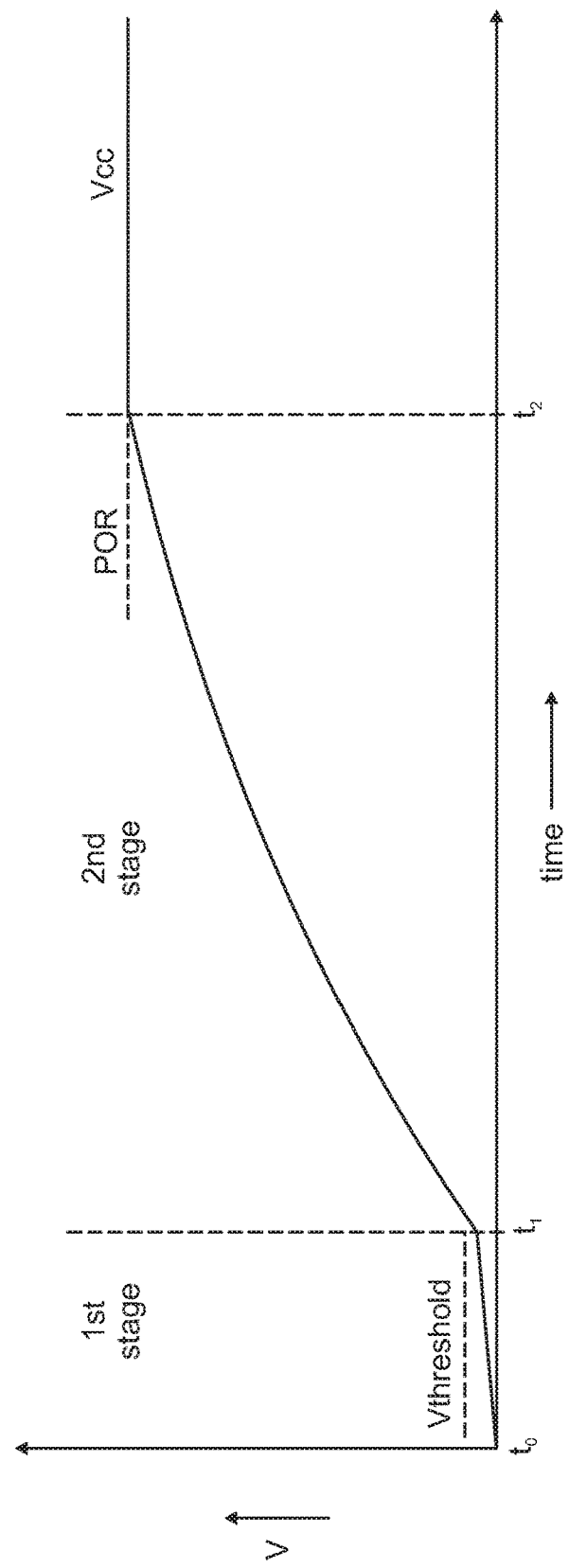
FIG. 1B illustrates the power supply voltage waveform as a function of time during the startup charging period and also during normal operation in accordance with an embodiment of the disclosure.

The resulting timing of the first and second stages is shown in FIG. 1B. At a time t0, the rectified input voltage is applied to flyback converter 100 such that the first stage of Vcc charging ensues. The power supply voltage Vcc thus slowly rises until it reaches its threshold value at a time t1. Switch controller 110 then activates the low impedance charging path such that the second stage of Vcc charging begins. Vcc is then rapidly charged until a time t2 when Vcc reaches the POR level, whereupon normal operation ensues. Note that the value of the threshold voltage is relatively small compared to the POR level such that the duration of the first stage is substantially less than the duration of the second stage. Any voltage ringing caused by the high impedance charging path in the first stage will thus be damped during the relatively-long duration of the second stage.

Figure 2:
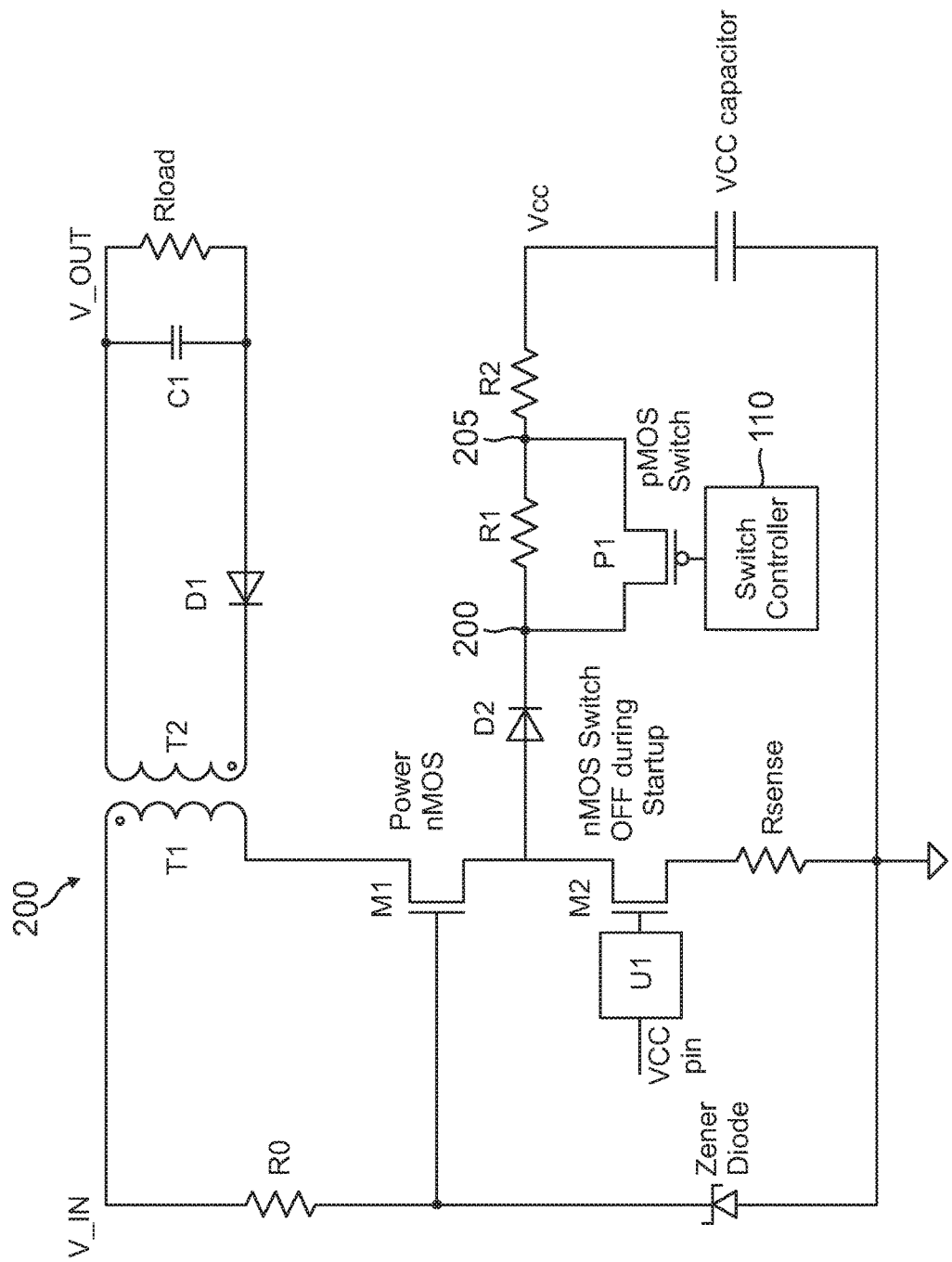
FIG. 2 is a diagram of a flyback converter configured for dual stage Vcc charging in which the high impedance current limiting resistor and the low impedance current limiting resistor are arranged in series in accordance with another embodiment of the disclosure.

A serial combination of the current limiting resistors R1 and R2 will now be discussed with regard to flyback converter 200 of FIG. 2. The primary winding T1, secondary winding T2, diode D1, output capacitor C1, the load, resistor R0, the zener diode, startup switch transistor M1, power switch transistor M2, sense resistor Rsense, and startup diode D2 are arranged as discussed with regard to flyback converter 100. However, high impedance current limiting resistor R1 is in series with low impedance current limiting resistor R2. Specifically, output diode D2 couples to high impedance current limiting resistor R1 at a node 200. High impedance current limiting resistor R1 in turn couples to Vcc capacitor by coupling to low impedance current limiting resistor R2 at a node 205. Impedance switch transistor P1 couples to nodes 200 and 205 such that impedance switch transistor P1 shorts out high impedance current limiting resistor R1 when impedance switch transistor P1 is on. Referring again to FIG. 1B, it may thus be seen that switch controller 110 would function as discussed with regard to flyback converter 100 in that switch controller 110 would keep impedance switch transistor P1 off during the first stage. When the power supply voltage Vcc reaches the threshold voltage, switch controller 110 switches impedance switch transistor P1 on to short out high impedance current limiting resistor R1 and activate the second charging stage.

Figure 3:
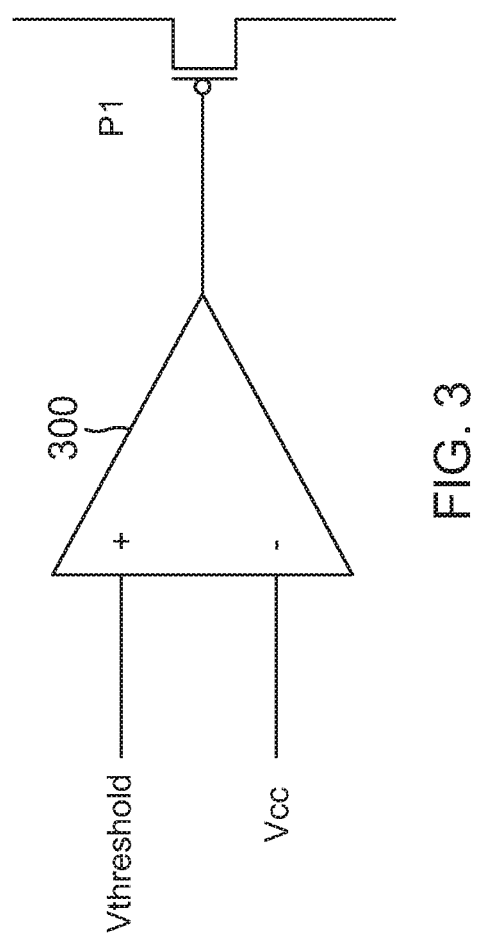
FIG. 3 is a diagram for a switch controller of a flyback converter in accordance with an embodiment of the disclosure.

To control the on and off states of impedance switch transistor P1, switch controller 110 may include a comparator 300 as shown in FIG. 3. The threshold voltage is received at a positive input for comparator 300 whereas the power supply voltage Vcc is received at the negative input. An output of comparator 300 received at a gate of impedance switch transistor P1 is thus charged high while the power supply voltage Vcc is less than the threshold voltage during the first stage of the startup charging period to maintain impedance switch transistor P1 off. But when the power supply voltage Vcc exceeds the threshold voltage, the output of comparator 300 is discharged to ground to switch on impedance switch transistor P1 for the second stage of the startup charging period.

Figure 4:
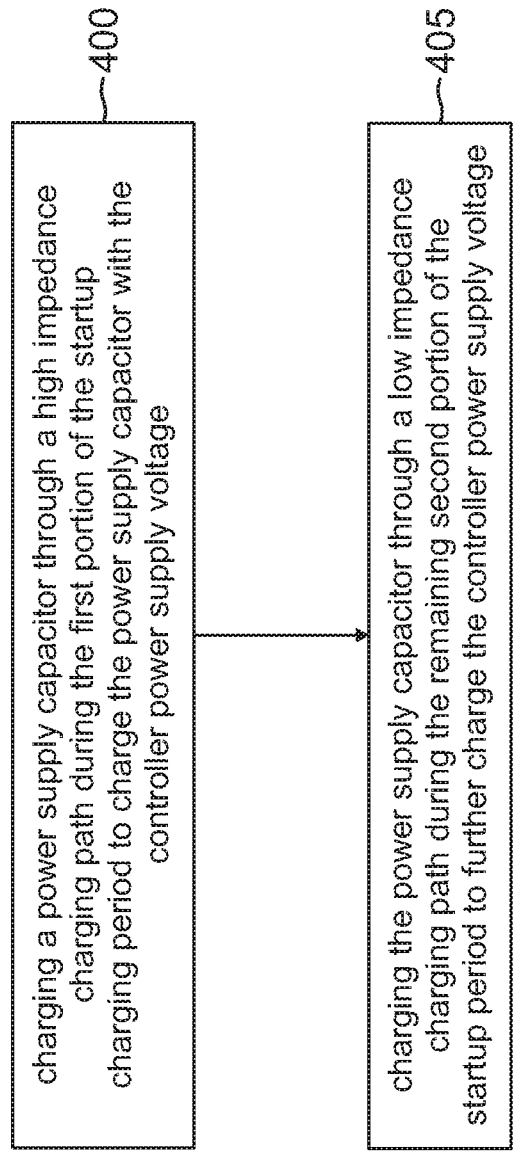
FIG. 4 is a flowchart for a method of operation of a flyback converter in accordance with an embodiment of the disclosure.

A method of operation for a startup circuit will now be discussed with regard to the flowchart of FIG. 4. The method includes an act 400 of charging a power supply capacitor through a high impedance charging path during the first portion of the startup charging period to charge the power supply capacitor with the controller power supply voltage. The charging of the VCC capacitor in flyback converters 100 and 200 during the first stage of the startup charging period is an example of act 400. In addition, the method includes an act 405 of charging the power supply capacitor through a low impedance charging path during the remaining second portion of the startup charging period to further charge the controller power supply voltage. The charging of the Vcc capacitor in flyback converters 100 and 200 during the second stage of the startup charging period is an example of act 405.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A startup circuit in a switching power converter, comprising:
   a high impedance charging path including a high impedance resistor;

a low impedance charging path including a low impedance resistor, wherein an impedance of the high impedance resistor is greater than an impedance of the low impedance resistor;
an impedance switch transistor configured to couple the high impedance charging path to a power supply capacitor while the impedance switch transistor is off and to couple the low impedance charging path to the power supply capacitor while the impedance switch transistor is on; and
a switch controller configured to switch the impedance switch transistor off while a power supply voltage stored on the power supply capacitor is less than a threshold voltage and to switch the impedance switch transistor on while the power supply voltage is greater than the threshold voltage.

2. The startup circuit of claim 1, wherein the impedance switch transistor is a p-channel metal oxide semiconductor (pMOS) impedance switch transistor.

3. The startup circuit of claim 1, further comprising:
a power switch; and
a power switch controller, wherein the power switch controller is configured to be powered by the power supply voltage to control a cycling of the power switch.

4. The startup circuit of claim 1, wherein the switching power converter is a flyback converter, and wherein the startup circuit further comprises a first resistor couple in series with a zener diode between an input voltage node for the flyback converter and ground, and wherein a node between the first resistor and the zener diode couples to a gate of a startup switch transistor coupled to a primary winding of a transformer in the flyback converter.

5. The startup circuit of claim 1, wherein the switch controller is integrated within a power switch controller.

6. The startup circuit of claim 1, wherein the switch controller includes a comparator configured to compare Vcc to the threshold voltage, and wherein an output of the comparator is coupled to a gate of the impedance switch transistor.

7. The startup circuit of claim 4, further comprising:
a startup diode coupled between a source of the startup switch transistor and a first node; wherein the high impedance resistor is coupled between the first node and a second node, and wherein the low impedance resistor is coupled to the second node, and wherein the impedance switch transistor is coupled between the low impedance resistor and the first node.

8. The startup circuit of claim 4, further comprising:
a startup diode coupled between a source of the startup switch transistor and a first node; wherein the high impedance resistor coupled between the first node and a second node, and a low impedance resistor is coupled to the second node, and wherein the impedance switch transistor is coupled between the first node and the second node.

9. A startup method for developing a controller power supply voltage for a switching power converter during a startup charging period, wherein the startup charging period is divided into a first portion and a remaining second portion, the startup method comprising:
charging a power supply capacitor through a high impedance charging path including a high impedance resistor during the first portion of the startup charging period to charge the power supply capacitor to a threshold voltage; and
charging the power supply capacitor through a low impedance charging path including a low impedance resistor during the remaining second portion of the startup charging period to further charge the controller power supply voltage, wherein an impedance of the high impedance resistor is greater than an impedance of the low impedance resistor.

10. The startup method of claim 9, further comprising terminating the remaining second portion of the startup charging period responsive to the controller power supply voltage reaching a power on reset level.

11. The startup method of claim 9, wherein charging the power supply capacitor through the low impedance charging path comprises shorting out the high impedance by switching on an impedance switch transistor coupled across the high impedance resistor.

12. The startup method of claim 9, wherein charging the power supply capacitor through the low impedance charging path comprises switching on an impedance switch transistor to couple the low impedance resistor in parallel with the high impedance resistor.

13. The startup method of claim 9, further comprising comparing the controller power supply voltage to a threshold voltage, wherein charging the power supply capacitor through the high impedance charging path during the first portion of the startup charging period occurs while the controller power supply voltage is less than the threshold voltage.

14. The startup method of claim 10, further comprising powering a controller with the controller power supply voltage after terminating the remaining second portion of the startup charging period while the controller controls the cycling of a power switch in the switching power converter to regulate a power delivery to a load.

15. The startup method of claim 11, wherein switching on the impedance switch transistor comprises switching on a PMOS impedance switch transistor responsive to the controller power supply voltage exceeding a threshold voltage.

16. The startup method of claim 12, wherein switching on the impedance switch transistor comprises switching on a PMOS impedance switch transistor responsive to the controller power supply voltage exceeding a threshold voltage.

17. The startup method of claim 13, wherein charging the power supply capacitor through the low impedance charging path occurs while the controller voltage is greater than the threshold voltage and less than a power on reset value.

18. The startup method of claim 16, further comprising:
charging a zener diode to form a zener breakdown voltage;
switching on a startup switch transistor coupled to a primary winding of a transformer to charge a source of the startup switch transistor responsive to zener breakdown voltage; and
rectifying the charge on the source of the startup switch transistor through a startup diode to charge a first node, wherein both the high impedance charging path and the low impedance charging path are charged by the charging of the first node.

19. A startup circuit for a switching power converter, comprising:
a first resistor connected to form part of a charging path for a Vcc capacitor;
a second resistor connected to form part of the charging path for the Vcc capacitor;
a path switching transistor having a first terminal connected to the first resistor and having a second terminal connected to the second resistor, wherein:
when the path switching transistor is in an ON state, the second resistor is determinative of an impedance of the charging path for the Vcc capacitor such that the charging path is a low-impedance path for charging the Vcc capacitor, and when the path switching transistor is in an OFF state, the first resistor is determinative of the impedance of the charging path for the Vcc capacitor such that the charging path is a high-impedance path for charging the Vcc capacitor; and a switch controller coupled to the path switching transistor and configured to compare a capacitor voltage across the Vcc capacitor to a threshold voltage, to place the path switching transistor in an ON state when the capacitor voltage is less than the threshold voltage, and to place the path switching transistor in an OFF state when the capacitor voltage reaches or is greater than the threshold voltage.

20. The startup circuit of claim 19, wherein:

the first resistor and the second resistor are connected in parallel when the path switching transistor is in the ON state; and the second resistor is isolated from the charging path when the path switching transistor is in the OFF state.

21. The startup circuit of claim 19, wherein:

the first resistor and the second resistor are connected in series when the path switching transistor is in the OFF state; and the first resistor is shorted from the charging path when the path switching transistor is in the ON state.

* * * * *